Dec. 11, 1956  T. TEILING  2,773,643
DEVICES FOR FOLLOWING A MOVABLE OBJECT
Filed Sept. 25, 1951  3 Sheets-Sheet 1

United States Patent Office 2,773,643
Patented Dec. 11, 1956

2,773,643

DEVICES FOR FOLLOWING A MOVABLE OBJECT

Torbern Teiling, Lidingo, Sweden, assignor to Arenco Aktiebolag, Stockholm, Sweden, a Swedish joint-stock company Application September 25, 1951, Serial No. 248,130
Claims priority, application Sweden September 29, 1950

5 Claims. (Cl. 235—61.5)

The present invention relates to devices for following an object during its motion so as to determine the geometrical coordinates of the object. More particularly, the invention relates to a device of that kind in which one or several tracking members, for example directional instruments or range finders, adapted at any instant to indicate by their adjustments the polar coordinates of the object in a two- or three-dimensional coordinate system, obtain their movement from automatically acting operating members, the movements of which during the course of tracking is initiated and corrected by manually or automatically operable control members.

Such devices are mainly used for following movements of targets, for example when laying guns, wherefore the description of the invention will hereinafter relate to a device especially adapted for that purpose. But the invention is, of course, not restricted thereto.

Figure 1:
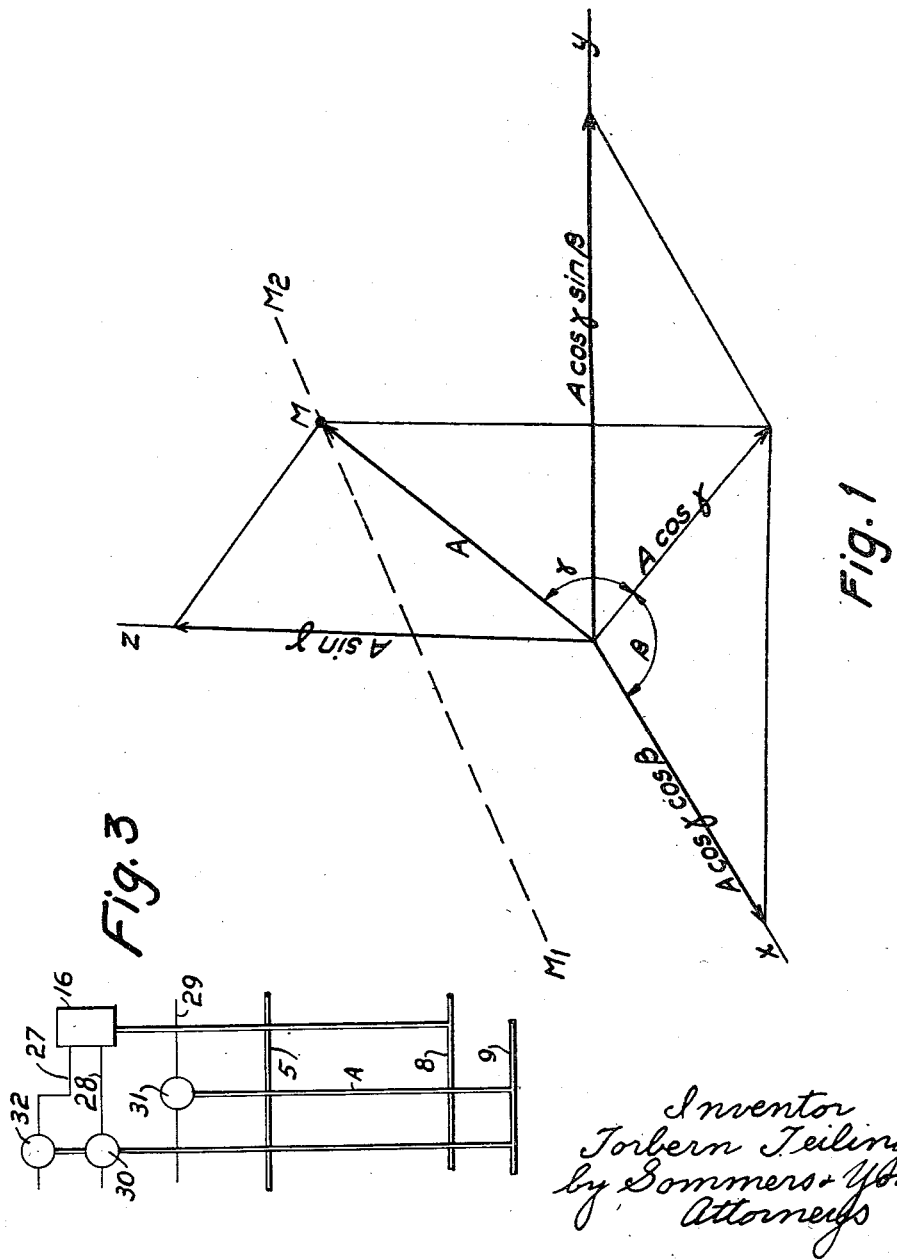
Figure 2:
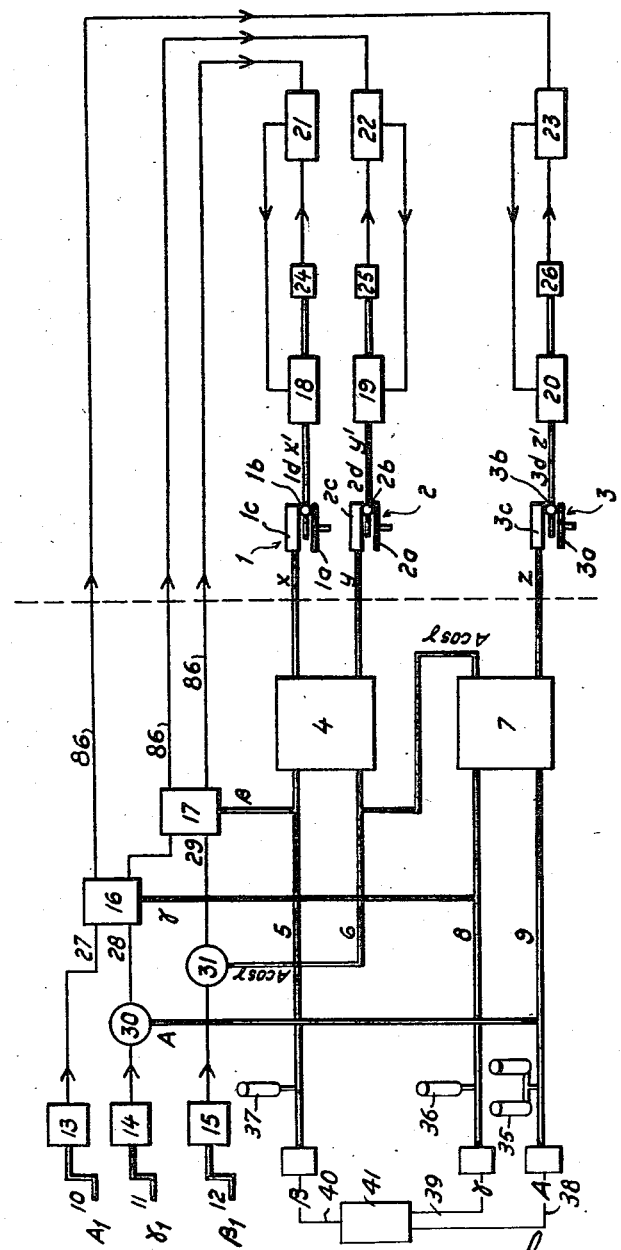
Figure 4:
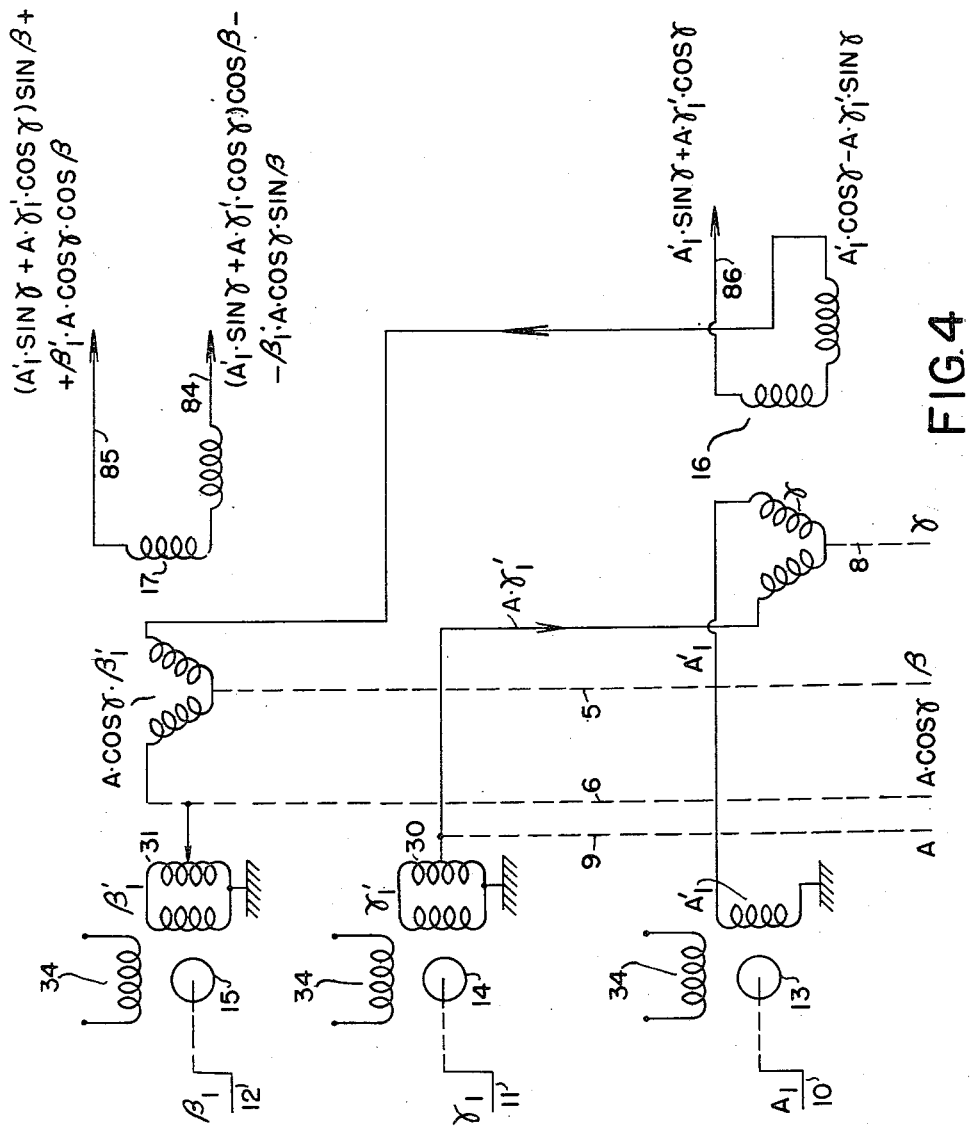

My invention will be more clearly understood from the specification hereinafter following by reference to the accompanying drawings, in which:

Fig. 1 is a vector diagram explaining the principles of my invention;

Fig. 2 schematically illustrates the manner of transmitting input signals for controlling components of speed in the rectangular coordinate system according to my invention;

Fig. 3 shows the manner of coordinating the sighting and tracking components of my invention; and Fig. 4 diagrammatically shows the manner of transmitting polar coordinate input signals in the system of my invention.

The problem under consideration will be presented and the difficulties when solving same will be indicated with reference to Fig. 1 of the annexed drawings.

In Fig. 1 an object assumed to move along the dash line $M_1$—$M_2$ is designated by M. For example, when laying a gun, the range, the altitudinal angle and the azimuth angle, that is radius vector A as well as the angles $\gamma$ and $\beta$ in the figure are measured continually. The mode of performing the tracking movement being nearest at hand consists in directly actuating the tracking member or members, which in an optical sight consist of directional and range finding instruments, by means of their operating hand wheels or the like, thus having to be kept moving continuously. This method is, however, relatively imperfect because the tracking movement will in this case be effected principally by correction point after point in the path of movement of the object, viz. by the adjustment of the directional and range finding instruments, causing more or less regular, continuous oscillations of the measured point about the target. Thus, the speed of the target in the respective coordinate of the polar coordinate system is in this case represented by the rotary velocity of the corresponding operating hand wheel.

The movement of a target is as a rule uniform and rectilinear. Thus, if the assumption is made that the target M moves in a straight line course at a constant speed along the line $M_1$—$M_2$ it will be easily understood that the time derivatives of A, $\gamma$ and $\beta$ are not constant, that is, the components of velocity in the polar coordinate system vary during the course of tracking. This involves, in turn, that the average rotary speed of the operating hand wheels has to be changed successively so that a subjective estimation of the rotary velocity as required to maintain coincidence between the point of aim and the object with the aid of previous observations will be difficult.

It is better to use separate operating means, which control the tracking member or members mechanically to perform automatically a movement which is established by observation of the previous movement of the object, viz. on the assumption that said movement will thereafter follow a law of motion established by the observations. Thus, after this automatical movement has been initiated, only required corrections of same need to be made during the course of tracking, viz. according as the point of aim proves not to coincide with the target, depending on inaccurate measurement of the movement of the target or inconsistencies of the movement of the target with the law of movement as presumed.

The aforesaid automatical tracking movement is assumed to be a uniform rectilinear motion involving that the target moves in an invariable direction and at an invariable speed after the initiation or correction of the automatical movement of the tracking member or members has been finished.

As mentioned previously the derivatives of the polar coordinates will not be constant at such a movement, wherefore hand wheels or the like for directly adjusting the tracking member or members cannot be driven at a constant speed. But a uniform rectilinear movement of the target can be represented by constant components of velocity along the axes of a stationary Euclidean, for example, rectangular, system of coordinates. Therefore, for effecting the tracking movement, quantities are, according to the invention, produced that represent such constant components of velocity which, after integration and transformation of coordinates, actuate the adjusting means of the tracking member or members. Since the observations of the movement of the target are made in the polar coordinates each input signal for setting the automatical tracking movement has to primarily represent components of speed in this system of coordinates. From the following description of Fig. 2 it will be apparent how said input signals are transmitted and caused to influence the components of speed in the rectangular coordinate system in a desired manner, said figure showing very diagrammatically an example of a practicable embodiment of an arrangement according to the invention.

Referring to Fig. 2 of the drawings, 1, 2 and 3 designate ball- and disc-integrators known per se, each having a disc 1a, 2a, 3a which are each driven at a constant rotary velocity by a motor and have each a ball 1b, 2b, 3b (in practice conveniently two balls engaging each other in each integrator). Said balls transmit the motion of the discs 1a, 2a, 3a to a roller 1c, 2c and 3c respectively, and the radial distance of said balls from the center of the disc can be adjusted by means of a screw 1d, 2d, 3d. By this arrangement the angle of rotation of the rollers 1c, 2c, 3c will be proportional to the time integral of the motion of the screws. The angular positions of said screws represent, according to the invention, components of speed in said rectangular system of coordinates which are designated by $x'$, $y'$ and $z'$. Thus, the integrators 1, 2 and 3 produce instantaneous values of the coordinates $x$, $y$, and $z$ of the target.

As shown in Fig. 1 the following relations exist between the coordinates $x$, $y$, $z$ on one hand and A, $\gamma$, $\beta$ on the other hand:

$$x = A \cos \gamma \cos \beta$$
$$y = A \cos \gamma \sin \beta$$
$$z = A \sin \gamma$$

The projection of radius vector A on the $xy$-plane is $= A \cos \gamma$.

The angles of rotation of the rollers 1c and 2c of the integrators 1 and 2 are proportional to the $x$ and $y$ coordinates and introduced into a secondary calculator or coordinate transformer 4, of the kind shown in United States Patent No. 2,340,865 to Chafee, which calculates corresponding values of $\beta$ and $A \cos \gamma$ from the values of $x$ and $y$ and adjusts the shafts 5 and 6 so that the angles of rotation of the latter will be proportional to said values. The shaft 5 operates a sight 37 for adjustment in azimuth and the shaft 6 is connected to another secondary calculator or coordinate transformer 7, of the kind shown in Figure 3 of United States Patent No. 2,340,865 to Chafee, which at its input side is also connected to the roller 3c of the integrator 3 so that it receives an angle of rotation therefrom that is proportional to the $z$ coordinate. The calculator 7 calculates from the components $z$ and $A \cos \gamma$ the coordinates $\gamma$ and A in the polar system of coordinates and transmits them as angles of rotation of the output shafts 8 and 9 to the sights 36 and 35 for adjustment for the altitudinal angle and the range.

The shafts 5, 8 and 9 are in conventional manner connected to a range and position instrument having the directional sights 36, 37 and the range sights 35 and to a Selsyn transmission system 38, 39, 40 or the like for introducing the data A, $\gamma$, $\beta$ to a gun fire control instrument 41, or for transmission of the tracking motion to a searchlight battery or another device. They can, of course, also be provided with graduations for visual reading.

From the foregoing it is apparent that each tracking motion as having been set, corresponds to constant angular settings of the input shafts 1d, 2d and 3d of the integrators 1, 2 and 3. Thus, at each tracking, constant angular settings are primarily to be made which correspond to the motion of the target and which are thereafter adjusted according as corrections prove to be required.

Initiation and correction of the tracking movement is effected by means of error correcting members consisting of the control or input handles 10, 11 and 12. (Figs. 2 and 4 of the drawings) to produce operating quantities $A_1$, $\gamma_1$ and $\beta_1$ responsive to the range A, the altitudinal angle $\gamma$ and the azimuth angle $\beta$. Thus, the handles 10, 11 and 12 operate tachometer generators 13, 14 and 15 (Figs. 2 and 4) the windings 34 of which are connected to the network (not shown) so that said generators produce output voltages $A_1'$, $\gamma_1'$ and $\beta_1'$ (Fig. 4) proportional to the time derivatives of the rotary movements of the handles 10, 11 and 12. Said output voltages, proportional to time derivatives of polar components, are converted into rectangular coordinates in resolvers 16 and 17 constituting primary coordinate transformers. Thus, the voltage $A_1'$ is introduced into one of the primary windings of the resolver 16 controlled by the shaft 8, the angular position of which is equal to the angle $\gamma$. The other primary winding of the resolver 16 is supplied with the voltage A. $\gamma_1'$ obtained from A as described hereinafter in connection with the potentiometer 30 and from $\gamma_1'$ after voltage division in the potentiometer 30. Thereby voltages are produced in the secondary windings of the resolver 16, viz. the voltages $A_1' \cdot \sin \gamma + A \cdot \gamma_1' \cdot \cos \gamma$ and $A_1' \cos \gamma - A \cdot \gamma_1' \cdot \sin \gamma$ as indicated in Fig. 4. The voltages $A_1' \cdot \sin \gamma + A \cdot \gamma_1' \cdot \cos \gamma$ and $A_1' \cdot \cos \gamma - A \cdot \gamma_1' \cdot \sin \gamma$ correspond to the vector projection of the original voltages normal to the horizontal plane and transmitted through the line 86 supplied to the motor 20 connected to the screw 3d of the integrator 3, viz. through an amplifier 23. The voltage $A_1' \cdot \cos \gamma - A \cdot \gamma_1' \cdot \sin \gamma$ corresponds to the projection of the original voltages in the horizontal plane, i. e. the $xy$-plane in the same direction as the vector $A \cdot \cos \gamma$ in Fig. 1, and is supplied to one of the primary windings of the resolver 17, which is controlled by the shaft 5 the angular position of which is equal to the angle $\beta$. The other primary winding of the resolver 17 is supplied with the value $A \cdot \cos \gamma \cdot \beta_1'$ which is proportional to $A \cdot \cos \gamma$ supplied from shaft 6 in a manner described hereinafter in connection with the potentiometer 31 and to $\beta_1'$ obtained by voltage division in the potentiometer 31. Thereby the values $$(A_1' \cdot \sin \gamma + A \cdot \gamma_1' \cdot \cos \gamma) \sin \beta + \beta_1' \cdot A \cdot \cos \gamma \cdot \cos \beta$$

transmitted through line 85 and $$(A_1' \cdot \sin \gamma + A \cdot \gamma_1' \cdot \cos \gamma) \cos \beta - \beta_1' \cdot A \cdot \cos \gamma \cdot \sin \beta$$

transmitted through line 84 are induced in the secondary windings of the resolver 17 and transmitted through the lines 85 and 84, respectively, to the motor 19 connected to the screw 2d of the integrator 2, viz. through the amplifier 22, and to the motor 18 connected to the screw 1d of the integrator 1 through amplifier 21.

The potentiometer 30 is rotated by the shaft 9, the rotation of which is proportional to A so that, if the input voltage of said potentiometer is constant, the output voltage of said potentiometer is directly proportional to A. Since the potentiometer 30 is, according to Fig. 4, from the tachometer generator 14 supplied with a voltage which corresponds to $\gamma_1'$ as explained hereinbefore it will be obvious that the output voltage from 30 will be proportional to $A \cdot \gamma_1'$.

Similarly, the potentiometer is rotated by the shaft 5 the rotation of which corresponds to $A \cdot \cos \gamma$, and it is supplied with a voltage corresponding to $\beta_1'$. The output voltage of the potentiometer will then be proportional to $A \cdot \cos \gamma \cdot \beta_1'$. The motors 18, 19 and 20 are adapted to rotate at a velocity proportional to the voltage and, consequently, they act as integrators, the angles of rotation of which represent the time integrals of the rectangular components of the input voltages. In order that these motors satisfy as accurately as possible the condition as made, viz. that they rotate at a velocity proportional to the voltage, they are connected to tachometer generators 24, 25 and 26 the voltages of which are compared with the input voltages. The difference voltages are added to the input voltages whereby the motors obtain an excess voltage which counteracts tendencies of deviation from the law of constant proportions.

The initiation of a tracking movement is effected in such manner that the input handles 10, 11 and 12 are rotated so that the sights 35, 36 and 37 will train the target. After having attained this result the handles are arrested whereafter the sights continue training a movement in an invariable direction and at a constant speed through space, said data being determined by the angular positions of the shafts 1d, 2d and 3d of the integrators 1, 2 and 3 thereby having been set.

A more detailed explanation of the mode of operation of the device in connection with the transformation of coordinates from the voltages emitted by the tachometer generators 13, 14 and 15 might be justified.

As understood from the foregoing the momentary values (if alternating current, the momentary effective or instantaneous values) of the components of the control voltages as transmitted from the resolvers 16 and 17 through the lines 84, 85, and 86 will represent accelerations in the direction of the respective $x$, $y$ and $z$ axes. Since the observations of the true position of the target relative to the measured point are made in the polar coordinate system the momentary values of the control voltages entering through the lines 27, 28 and 29 represent conveniently accelerations in range, elevation and azimuth. Thus, the momentary variations of components that can be produced by the input handles 10, 11 and 12 consist of one component in the direction of the adjusted inclined range (controlled by the handle 10), another component perpendicular thereto in the vertical plane (controlled by the handle 11) and a third component (controlled by the handle 12) perpendicular to both the other components and in the horizontal plane. A simple analysis of the relationship between the components in this polar coordinate system and the components in the rectangular coordinate system shows that a component in the direction of the line of sight will give an $x$ component proportional to $\cos \gamma \cos \beta$, a $y$ component proportional to $\cos \gamma \sin \beta$, and a $z$ component proportional to $\sin \gamma$. A component in azimuth will give an $x$ component proportional to $\sin \beta$ and a $y$ component proportional to $\cos \beta$ but there is no $z$ component in this case.

Since the control of the tracking movement in the device according to the invention is characterized by "correction to zero" the relationship between the movements (or positions) of the input handles 10, 11 and 12 and the control voltages transmitted through the lines 27 to 29 will be immaterial. The only condition for carrying the desired uniform tracking movement into effect consists in that said control voltages shall be reduced to zero after each correction so that the shafts $1d$, $2d$ and $3d$ will be at rest thereafter and set the ball and disc integrators 1, 2 and 3 for constant components of rate $x'$, $y'$ and $z'$. Thus, in the embodiment as described in which the control voltages are generated by tachometer generators 13, 14 and 15 operated by the input handles 10, 11 and 12 the desired tracking movement has been established as soon as the input handles have been arrested. It will be understood, however, that it is particularly convenient to primarily estimate the requisite rotary movements of the input handles approximately for correction of a deviation of the tracking movement from the movement of the target as observed in the sights 35, 36 and 37. Therefore, in the best constructions, as in the device described herewith, there is a direct proportionality between the rotations of the input handles 10, 11 and 12 and the voltages generated thereby.

It should be noted that an observed inconsistency in elevation or azimuth between the point of aim and the target is perceived by the observer as a distance, which does not form any definite measure of the inconsistency, because the ratio between the measured distance and the actual one is proportional to the range. Therefore, if no special measures are taken, the distance thus having been observed does not give a full indication as to the manual adjusting operation that might be required to obtain a correction. For that reason potentiometers 30 and 31 are, according to the invention, introduced into the lines 28 and 29 for correction in the vertical and azimuth, respectively. The potentiometer 30 is operated from the shaft 9 (Figs. 2 and 3), and consequently, it is adjusted into an angular position that is proportional to the inclined range A of the point of aim. The voltage supplied through line 28 to the resolver 16 will in this manner be proportional to A. The following relationship between said voltage, $V_i$, the control voltage E, the range A, and the rotary velocity $n_\gamma$ of the input handle 11 will be valid:

$$V_i = K_1 \cdot A \cdot E = K_2 \cdot A \cdot n_\gamma$$

Since the shaft $1d$ has a rotary velocity that is proportional to the input voltage $V_i$, as described hereinbefore, the displacement of the ball $1b$ of the integrator 1 will be proportional to $\tau \int^t V_x dt$. Since $\int V_x dt$ is proportional to the projection of $V_i$ on the $x$-axis, the displacement of the ball $1b$ will be proportional to $\tau \int^t A \cdot n_\gamma \cdot \sin \gamma \cdot \cos dt$, i. e. proportional to the angle of rotation of the input handle 10.

The potentiometer 31 controls the azimuth angle exactly in the same manner. This potentiometer can be operated either by the shaft 6, as shown in Fig. 2 or from shaft 9, as shown in Fig. 3. If operated from shaft 9 a sensitivity is obtained that is dependent on the inclined range A and if operated by shaft 6 the sensitivity will be dependent on the projection $A \cdot \cos \gamma$ of said range on the $xy$-plane. The embodiment as shown in Fig. 2 is frequently preferred whereby the sensitivity is dependent on the horizontal range of the target.

In range finding instruments of the stereoscopic type an inconsistency as observed in the instrument will in similar manner be dependent on the range wherefore it might be suitable in such cases to introduce into the line 27 still another potentiometer 32 (Fig. 3) controlled by the shaft 9.

In the embodiment as described hereinbefore the control voltages are proportional to the rotary velocities of the input handles 10, 11, and 12. This is as a rule especially convenient. Thus, if a lead of the target is to be regained it is sufficient to turn the input handles, e. g., through additional angles and an accurate coincidence can easily be obtained by successively decreasing the rotary velocity of the said handles at the end of the correction movement and when said movement has been finished proper velocity values have been applied to the integrators 1, 2 and 3. It is, however, also possible to make use of other principles for generating control voltages, for example, so that said voltages will be proportional to the angles of rotation of the input handles, which will occur, for example, if said handles are connected to potentiometers. Such an arrangement is, however, less suitable because the input handles have in such case to return to zero position at every correction and obtain dimension of acceleration.

The elements shown in the arrangement as described, such as integrators, differentiators, calculators, etc. can, of course, be replaced by other devices having equivalent mechanical or electrical functions.

The control members for initiating and correcting the tracking movement need not to be actuated manually. It is, for example, possible to utilize the device for tracking polar coordinates already measured (for example, by the aid of radar), whereby error measuring members are devised which compare the output coordinates of a radar equipment with the values A, $\gamma$, $\beta$ of the shafts 9, 8 and 5 and effect operation of the tachometer generators 13 to 15, or supply the resolvers 16 and 17 with input voltages directly through a differentiating device.

Since many changes could be made in the above construction and many apparently widely different embodiments of this invention could be made without departing from the scope thereof, it is intended that all matter contained in the above description as shown in the accompanying drawings shall be interpreted as illustrative and not in a limiting sense. Thus, in a simplified embodiment the device can, for example, also be used for training movements in one plane only, for example, the horizontal plane, and it is immaterial what kind of tracking members will be used since they might be chosen with respect to the purpose only for which the device is adapted. It is believed that the modifications as required for the equipment of the device with electro-optical or acoustic tracking members will be obvious to any person skilled in the art.

I claim:

1. In a device for tracking a movable target, in combination, a plurality of sighting means adapted to continually follow the target and indicate the polar coordinates of said target, automatically operative speed integrators, error correcting members for producing correcting quantities, primary and secondary coordinate transformers, and automatically adjustable devices, said speed integrators being operable by said error correcting members and adapted to integrate components of speed in a stationary right angled system of coordinates and connected to said secondary coordinate transformers for converting the integrated components into polar coordinate quantities which control said sighting means, manually controllable tracking means individual to each of said primary coordinate transformers and adjustable to positions which are calculated from said correcting quantities values that are proportional to the projections of said correcting quantities in said right angled system of coordinates and means for transferring said values to said automatically adjustable devices for producing said components of speed and supplying them to said speed integrators.

2. A device according to claim 1 and in which there is provided, between said correcting members and said primary coordinate transformers, devices for differentiating the movements of said correcting members and transferring to said primary transformers operating quantities proportional to the time derivatives.

3. A device according to claim 1, in which there is provided, between said correcting members and said primary coordinate transformers, devices for differentiating the movements of said correcting members and transferring to said primary transformers operating quantities proportional to the time derivatives, and in which said differentiating devices consist of tachometer generators.

4. A device according to claim 1 and in which said adjustable devices are devised to integrate values received from said primary coordinate transformers and supply the integrated values to said speed integrators for further integration.

5. A device according to claim 1, in which said adjustable devices are devised to integrate values received from said primary coordinate transformers and supply the integrated values to said speed integrators for further integration, and in which the correcting quantities consist of voltages, said adjustable devices consisting of electric motors the rotary velocity of which is proportional to the voltage.

References Cited in the file of this patent

UNITED STATES PATENTS

| | | | |
|---|---|---|---|
| 2,340,865 | Chafee et al. | Feb. 8, | 1944 |
| 2,414,819 | Lakatos | Jan. 18, | 1947 |
| 2,492,355 | Campbell et al. | Dec. 27, | 1949 |
| 2,567,665 | Gerdin | Sept. 11, | 1951 |
| 2,578,202 | Palme | Dec. 11, | 1951 |

FOREIGN PATENTS

| | | |
|---|---|---|
| 164,765 | Great Britain | 1919 |